United States Patent Office 3,535,126
Patented Oct. 20, 1970

3,535,126
METHOD OF INCREASING THE PERMEABILITY OF CELLULAR MATERIALS
Gerhard Julius Haas, Woodcliff Lake, N.J., assignor to General Foods Corporation, White Plains, N.Y., a corporation of Delaware
No Drawing. Filed July 15, 1966, Ser. No. 565,370
Int. Cl. A23b 1/06, 3/06, 7/04
U.S. Cl. 99—193
9 Claims

ABSTRACT OF THE DISCLOSURE

A method of rendering a cellular food-stuff more permeable so that fluid materials, i.e. gases and liquids, will pass through the cellular foodstuff with greater facility by subjecting the cellular foodstuff to a pressure greater than about 50 p.s.i.g. and, while still under pressure, freezing. This treatment renders the foodstuff more permeable, resulting in a product that will cook faster, can be dehydrated and rehydrated more quickly and is more responsive to infusion or extraction processes.

BACKGROUND OF THE INVENTION

Means are constantly being sought to render processes such as dehydration, extraction, or infusion less costly and more practical. It is well known that more permeable materials can be dried more easily than less permeable materials, which indicates that the rate of drying a substance is directly related to its permeability. In the present discussion permeability means the ability of gases or liquids to pass through a cellular material either by passing through its pores or by diffusing through the cell walls. If the number of pores and the pore size of the material is small water passing from the interior to the surface of the material is restricted, whereas if the number of pores and the pore size is relatively large water will pass through the material with little or no resistance. Also, more rapid water removal in a cellular material is effected when the cell walls of the material readily permit the diffusion of water through the walls. In a similar manner the rate of rehydration of a material increases as its permeability increases.

It is also desirable to have a more permeable cellular structure in a food material when it is desired to add uniformly various substances to the food. For instance, when it is desired to sweeten fruits the uniformity of the sweetness will depend upon how deep the sugar solution can penetrate the fruit being treated. A fruit having good permeability can be very easily and uniformly sweetened in a relatively short period of time, whereas a fruit having poor permeability will absorb the sweetening agent at a much slower rate, if at all.

Various methods have been attempted in the search for an efficient process for increasing the permeability of cellular materials. For instance, processes involving vacuum puffing of materials such as dough-containing snacks are often employed for the purpose of increasing the porosity of the foodstuff. These processes are unsatisfactory for many purposes such as the treatment of fruits and vegetables, because in the expansion the cellular structure is destroyed and the fruit or vegetable loses its original shape and texture.

ADVANTAGES AND OBJECTS

The process taught in the present invention makes possible the modification of cellular foods such as fruits and vegetables such that their cell walls are much more permeable and yet the walls of these cells are still intact. There are many advantages of treating foods by the process of the present invention. First, when frozen foods have been frozen under pressure they cook much faster. A second advantage of the present invention is that pressure-frozen foods, when stored in the frozen state, retain their soft texture and can be eaten directly as removed from the freezer without the necessity of a thawing period. A third advantage of foods that are pressure-frozen is that because of their increased permeability substances can be more easily extracted from them when they are thawed. Further, the converse of extraction, that is, infusion of substances into a foodstuff to change the characteristics of the foodstuff, can also be more easily effected with foods that have been pressure-frozen, and thawed or dehydrated. A fourth advantage is that pressure-frozen foods can be dehydrated more easily and the resulting dehydrated product is very much improved with regard to texture, appearance and flavor.

Additional benefits may be obtained when dried cellular foodstuffs have been treated according to the present invention prior to drying. Thus, coconut which has been pressure treated and then dried has a more tender texture i.e. it is less chewy than dried coconut which has not been pressure-frozen. Again, when shrimps were treated according to the present invention and freeze-dried they maintained better color, giving the resulting dried shrimp a more pleasing appearance. A further change observed when treating fruits and vegetables according to the present invention prior to drying is that there is often a considerable improvement in the flavor in the food. This was noticeable in such foods as tomatoes, apples, blueberries, strawberries, onions etc. Lastly, pressure-frozen foods are considerably larger than the same foods that have not been pressure-frozen.

Accordingly, it is the object of the present invention to provide a method of increasing the porosity of cellular material. It is another object of the invention to provide frozen foods that can be eaten without thawing. It is still another object of the invention to provide faster cooking frozen foods. It is a further object of the invention to provide a cellular material that will easily permit the extraction or infusion of flavor or color substances. It is a still further object of the present invention to provide a process for rapidly dehydrating cellular foodstuffs. It is another object to provide dehydrated cellular foodstuffs which are more easily rehydrated and have a larger size and improved texture, flavor, and color.

DESCRIPTION OF THE INVENTION

According to the present invention a cellular foodstuff such as fruits, vegetables, meats or seafoods having their normal moisture content is placed in a pressure vessel and the pressure in the vessel is raised to about 50–1500 p.s.i.g. or higher. While the food material is held at the elevated pressure the temperature is reduced to about −20 to −25° C. and the foodstuff is permitted to thoroughly freeze. After the foodstuff is frozen the pressure is released.

The pressure to which the foodstuff is subjected will depend on the type of foodstuff, the effect desired and the method used to increase the pressure. For instance, if it is desired to render the foodstuff highly permeable a high pressure will be used, whereas if a mild permeability increase is desired a slight pressure increase is sufficient. Also, some foodstuffs require a much lower pressure to obtain a desired result, while others require a high pressure to obtain the same result.

Another variable to be considered in determining the pressure to be used is the method used to increase the pressure. While various methods can be used, such as hydrostatic and mechanical compression these methods are often impractical with foods. The most suitable method of increasing the pressure is by the use of gas pressure.

The pressure necessary to produce the desired result depends upon the particular gas being used. For instance, when using dichlorodifluoromethane to pressurize celery that is to be air-dried favorable results are obtained at pressures as low as 50 p.s.i.g., whereas when using gases such as air or nitrogen to pressurize fresh strawberries that are to be freeze-dried, the pressure should be higher, such as in the neighborhood of 1000 p.s.i.g. or more. A further limitation in the selection of the gas to be used is its physical characteristics. For example dichlorodifluoromethane cannot be used at pressures in excess of 70 p.s.i.g. because this gas begins to liquefy at this pressure and ambient temperature conditions.

The pressure-frozen food has utility in its frozen state or it can be further treated, depending on the desired end use of the product. As noted above certain fruits can be pressure-frozen and stored in the frozen state to serve as a new type dessert. As examples of this dessert are pressure-frozen bananas and strawberries. When one desires to eat some of the fruit, such as the banana, he merely removes it from the freezer and eats it as it is. The frozen fruit has the desirable qualities of being cold and yet soft. The invention also has application in the frozen food area, providing a frozen food that requires a much shorter cooking time. This application is particularly useful for such vegetables as green beans, peas etc.

The pressure-frozen food can be further treated in one of the following ways. Firstly, if it is desired to prepare a dehydrated product the food can be dried. The drying can be done by the freeze-drying method, in which case the commodity is directly dried in the frozen state, or by the air-drying method in which case the material to be dried is exposed to a current of air. Secondly, the pressure-frozen foodstuff can be thawed and subjected to such further treatments as extraction or infusion. These two treatments are of great benefit where it is desired to extract certain substances from the food or to add various substances to the food such as natural and synthetic sweetening agents, flavoring additives or texture modifiers.

When the after treatment of the material is to be dehydration it is often preferred to use the freeze-drying method. This is usually the case when fruits and vegetables which contain volatile food flavor components are to be treated, because the higher temperatures of the ordinary drying methods destroy much of the flavor of the fresh fruit or vegetable. A further advantage of freeze-drying is that the food being dried does not shrivel to any great degree, which is usually the case with conventional drying. Freeze-drying is particularly desirable for drying fruits such as strawberries, bananas, and oranges and vegetables such as peas, stringbeans and celery. When fruits are treated according to the present process and freeze-dried the texture of the fruit is uniform throughout due to uniform dehydration, whereas in the conventional freeze-drying process the center of the fruit often forms a hard core or there may be surface case hardening and in either of these cases the food does not rehydrate properly and has an undesirable texture.

Sometimes in preparing dried foods it is preferable to air-dry rather than freeze-dry the food. This is often the case when appearance is of secondary importance in view of economics, the cost of air-drying being considerably less than freeze-drying. The present invention now makes it possible to air-dry many foods without impairing their appearance. Thus, vegetables such as carrots, peas, celery and onions and meats such as chicken and seafoods such as codfish can be air-dried after being pressure-frozen, yielding a product that shows little or no shrivelling. For example, air-dried celery which had been frozen while at 1400 p.s.i.g. had a bulk density 5½ times that of regular air-dried celery. Further, many foods, such as peppers and cantaloupe, which could not formerly be air-dried to give a commercially acceptable product can now be air-dried after being pressure-frozen.

In order that the invention may be better understood the following examples will serve to illustrate specific applications of the invention.

EXAMPLE I

Fresh celery was cut into pieces about ¼ x ½ inch in size and placed in a Parr bomb. The pressure in the bomb was raised to 1000 p.s.i.g. over a period of 100 minutes by means of compressed nitrogen gas. The bomb was then placed in an ethylene glycol bath having a temperature of −22° C. and held there for 2 hours after which the pressure was reduced to atmospheric over a period of 1½ hours while maintaining the bomb in the bath. The celery was removed from the bomb and dried in a Proctor and Schwartz forced draft drier for one hour at 50° C. and then for 17 hours at 30° C. at which point the drying of the celery was complete.

As controls, fresh celery and celery frozen at atmospheric pressure were dried under identical conditions. The pressure-frozen sample rehydrated very rapidly yielding a product having very good structure and shape while the controls rehydrated very slowly and were badly shrivelled.

EXAMPLE II

Fresh celery was pressure-frozen and air-dried according to the procedure of Example I except that the pressure was varied. The results are tabulated below. The control was air-dried without pressure freezing.

TABLE I

| Pressure, p.s.i.g.: | Results |
| --- | --- |
| Control | Very slow rehydration, product very shrivelled. |
| 100 | Slow rehydration, some shrivelling. |
| 600 | Good rehydration, product was slightly shrivelled. |
| 1400 | Very good rehydration, product was not shrivelled. |

This example shows that as the pressure at which freezing is carried out is increased the product quality and rehydratability is improved.

EXAMPLE III

Fresh celery was pressure-frozen and air-dried according to the procedure of Example I except that the gas used was varied. The pressure at which freezing took place was 1000 p.s.i.g. The results are tabulated below. The control was air-dried without being pressure frozen.

TABLE II

| Gas used: | Product characteristics |
| --- | --- |
| Control | Slow rehydration, extensive shrivelling. |
| Methane | Very rapid rehydration, very slight shrivelling. |
| Carbon monoxide | Fast rehydration, slight shrivelling. |
| Air | Fast rehydration, slight shrivelling. |

This example shows that the product characteristics vary only to a slight degree when different gases are used to produce the pressure.

EXAMPLE IV

Example I was repeated using peppers, onions, potatoes, cooked rice, string beans, cantaloupe, boiled codfish, boiled chicken and fresh, sliced coconut in place of the celery. In each case the product had a better shape and texture and rehydrated faster than the regular air-dried counterpart. In the case of the coconut a product having a better flavor and less chewiness was obtained.

EXAMPLE V

Fresh strawberries were pressure-frozen according to the procedure of Example I. The frozen strawberries were then freeze-dried. The dried strawberries had a firmer and more uniform texture, a better flavor, and rehydrated more rapidly than strawberries frozen at the same temperature but at atmospheric pressure. The drying rate of the pressure frozen strawberries was about 30% greater than the drying rate of the strawberries frozen at atmospheric pressure.

EXAMPLE VI

Example V was repeated except that bananas, oranges, apples and tomatoes were substituted for the strawberries. The products had better flavor and texture and dehydrated and rehydrated more uniformly and rapidly than the regular freeze-dried counterpart.

EXAMPLE VII

Fresh strawberries were pressure frozen in a nitrogen atmosphere at 1000 p.s.i.g. and stored in the freezer compartment of a refrigerator with strawberries frozen at atmospheric pressure. After permitting the strawberries to reach equilibrium they were taken from the freezer and tasted without thawing. The pressure-frozen strawberries were soft and had a very good flavor while the strawberries frozen at atmospheric pressure were frozen hard and had very little flavor. The pressure-frozen strawberries were larger than those frozen at atmospheric pressure.

EXAMPLE VIII

Example VII was repeated except that blueberries were substituted for the strawberries. Again the pressure-frozen blueberries were softer and sweeter than the blueberries frozen at atmospheric pressure.

Examples VII and VIII illustrate that pressure treated foods can be eaten without the necessity of being thawed.

EXAMPLE IX

Fresh stringbeans were cut in 1½ inch strips, blanched for 1 minute in boiling water, removed from the water and divided into two portions. The first portion was frozen in a nitrogen atmosphere at 1000 p.s.i.g., and the second portion was frozen at atmospheric pressure. Both portions were stored in a freezer until equilibrium was reached and then they were cooked by placing them in boiling water. The pressure treated sample became soft and edible in 6–8 minutes while those frozen at atmospheric pressure required 10–12 minutes to reach the same degree of softness.

Example IX shows that freezing fresh foods under pressure reduces the cooking time of the frozen food.

Although the examples are directed only to the improvement of food products it is understood that the present invention can be used in nonfood applications such as the extraction of oils etc., from cellular materials such as olives, hops and perfume-yielding plants and the breadth of the invention is limited only by the scope of the appended claims.

What is claimed is:

1. A method of increasing the permeability of cellular food material comprising subjecting said cellular food material to gas pressure greater than 50 p.s.i.g. using a gas selected from the group consisting of methane, carbon monoxide, nitrogen, dichlorodifluoromethane, and air; and freezing said cellular material at about −20° to −25° C. while still under pressure.

2. A method according to claim 1 wherein the pressure is greater than 100 p.s.i.g.

3. A method according to claim 1 wherein the cellular food material is plant matter.

4. A method according to claim 1 wherein the cellular food material is animal matter.

5. A method of preparing a rapidly rehydratable dehydrated cellular food material comprising:
   (a) subjecting said cellular material to gas pressure greater than about 50 p.s.i.g. using a gas selected from the group consisting of methane, carbon monoxide, nitrogen, dichlorodifluoromethane, and air,
   (b) freezing said cellular material at about −20° to 25° C. while still under pressure,
   (c) releasing said pressure, and
   (d) drying said cellular material.

6. A process according to claim 5 wherein the cellular food material is selected from the group consisting of fruits, vegetables, meats and seafoods.

7. A process according to claim 6 wherein the method of drying is freeze-drying.

8. A method according to claim 6 wherein the method of drying is air-drying.

9. A process for improving the transmissibility of fluids through a celluar food material which comprises:
   (a) subjecting said material to gas pressure greater than about 50 p.s.i.g. using a gas selected from the group consisting of methane, carbon monoxide, nitrogen, dichlorodifluoromethane, and air,
   (b) freezing said cellular material to about −20° to −25° C. while still under pressure
   (c) releasing said pressure, and
   (d) thawing said frozen, cellular material.

References Cited

UNITED STATES PATENTS

| | | | |
|---|---|---|---|
| 2,278,472 | 4/1942 | Musher | 99—192 XR |
| 2,618,939 | 11/1952 | Morrison | 99—192 XR |
| 3,007,319 | 11/1961 | Ogden. | |
| 3,012,893 | 12/1961 | Kremzner et al. | |

RAYMOND N. JONES, Primary Examiner

J. M. HUNTER, Assistant Examiner

U.S. Cl. X.R.

99—125, 194, 195, 204, 208, 209